Oct. 31, 1961     D. E. STROMBERG     3,006,209
REVERSING TRANSMISSION
Filed Aug. 1, 1958     4 Sheets-Sheet 1
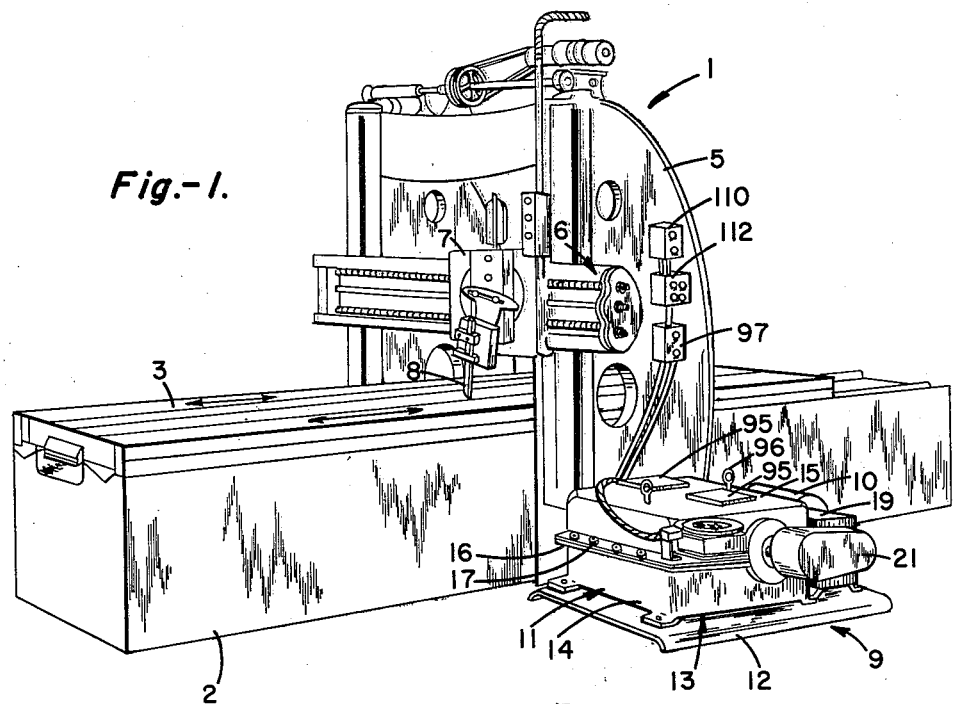
*Fig.-1.*
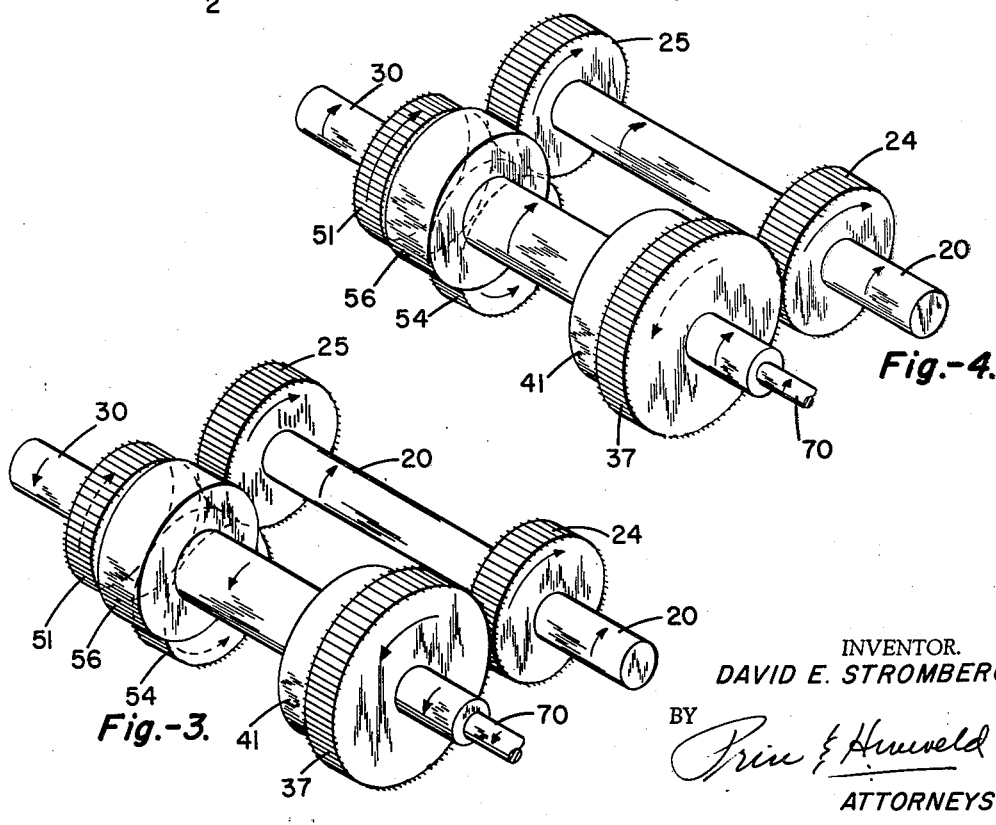
*Fig.-4.*
*Fig.-3.*
INVENTOR.
DAVID E. STROMBERG
BY *Prin & Hunveld*
ATTORNEYS

INVENTOR.
DAVID E. STROMBERG

BY

ATTORNEYS

United States Patent Office 3,006,209
Patented Oct. 31, 1961

3,006,209
REVERSING TRANSMISSION
David E. Stromberg, Traverse City, Mich., assignor to Stromberg-Carlson Tool & Die Company, Traverse City, Mich., a corporation of Michigan
Filed Aug. 1, 1958, Ser. No. 752,571
4 Claims. (Cl. 74—377)

This invention relates to machine tools and more particularly to an improved means for propelling the bed of machine tools utilizing a heavy reciprocating member.

Many machine tools, such as grinders, shapers, vertical spindle mills, utilize a stationary cutting head or tool in combination with a traveling bed. The work piece is secured to the bed and the bed is reciprocated back and forth beneath the tool to bring the tool into cutting contact with the work piece. In the past, various means have been devised for reciprocating the bed. These means have involved a number of problems which have not been entirely satisfactorily solved by presently available equipment.

The translation of rotary motion to reciprocating lineal motion has always involved serious difficulty. Not the least of these has been the overrun or inaccuracy of stroke length incident to bringing the bed to a halt at each limit of its travel. These beds are normally large and massive units having substantial momentum as they approach the end of the stroke and substantial inertia as the reverse motion is initiated. This produces rapid wear and frequent and costly replacement of the driving mechanism. The mechanisms have also been characterized by vibration and noise. The vibration is particularly undesirable because it tends to destroy the accuracy of the tool and thus to produce inaccurate machined parts. Where the lever and crank arrangement has been employed for reciprocating the bed, these problems have been particularly severe. Where a rack and pinion means of driving the bed has been employed, large and complex mechanisms have been necessary for reversing the direction of rotation of the driving pinion.

This invention provides a solution to these problems in the form of an integrated power source having a simple, efficient and substantially vibration-free reversing mechanism practically eliminating the shock, vibration and noise of conventional bed driving equipment. At the same time, it utilizes a power source constantly rotating in one direction. The entire driving mechanism for the bed is compact and readily adapted to both new and existing equipment.

Despite the small, compact nature of the equipment, it provides adequate power for reciprocating the bed. It also permits quick and accurate stroke length control. The stroke length may be adjusted in a matter of a few minutes to adapt the tool from one job requirement to another. The accuracy of stroke length control and the reduction of shock and vibration materially increases the efficiency and accuracy of the machine as well as its durability and service life.

Unlike previously available equipment for this purpose, all moving parts may be concealed, reducing the hazard to personnel. The equipment is particularly adapted to long life because it can be entirely enclosed and, therefore, is protected from dirt and other abrasive substances resulting in rapid wear in conventional equipment. The controls necessary for its operation are simple and may be easily understood by the operator. This simplicity reduces the chance of error in the parts manufactured on the machine.

These and other objects and purposes of this invention will be understood by those acquainted with the design and use of machine tools upon reading the following specification and the accompanying drawings.

In the drawings:

FIG. 1 is an oblique view of a machine tool equipped with this invention.

FIG. 2 is a horizontal section through the reversing transmission of this invention sectioned on the plane of the output shaft.

FIG. 3 is a schematic presentation of the gear trains in the reversing mechanism illustrating the mechanism in forward or cutting drive.

FIG. 7 is a plan view of the head of the stroke length control mechanism.

In attaining the objects and purposes of this invention, there is provided a prime mover connected to the bed of a machine tool through a reversing transmission. The prime mover drives an input shaft which is geared to an output shaft through two independent gear trains. Each of these trains is connected to the output shaft through a magnetic clutch. One of the gear trains is designed to drive the output shaft in the opposite direction to the input shaft while the other gear train is designed to drive it in the same direction. The direction of rotation of the output shaft is determined by which of the two clutches is engaged and, therefore, through which of the gear trains and torque is being transmitted. To this mechanism is coupled a stroke limit control element which automatically shifts the actuation of the clutches from one to the other. This control element is adjustable to determine the length of travel of the bed between direction reversals.

Figure 5:
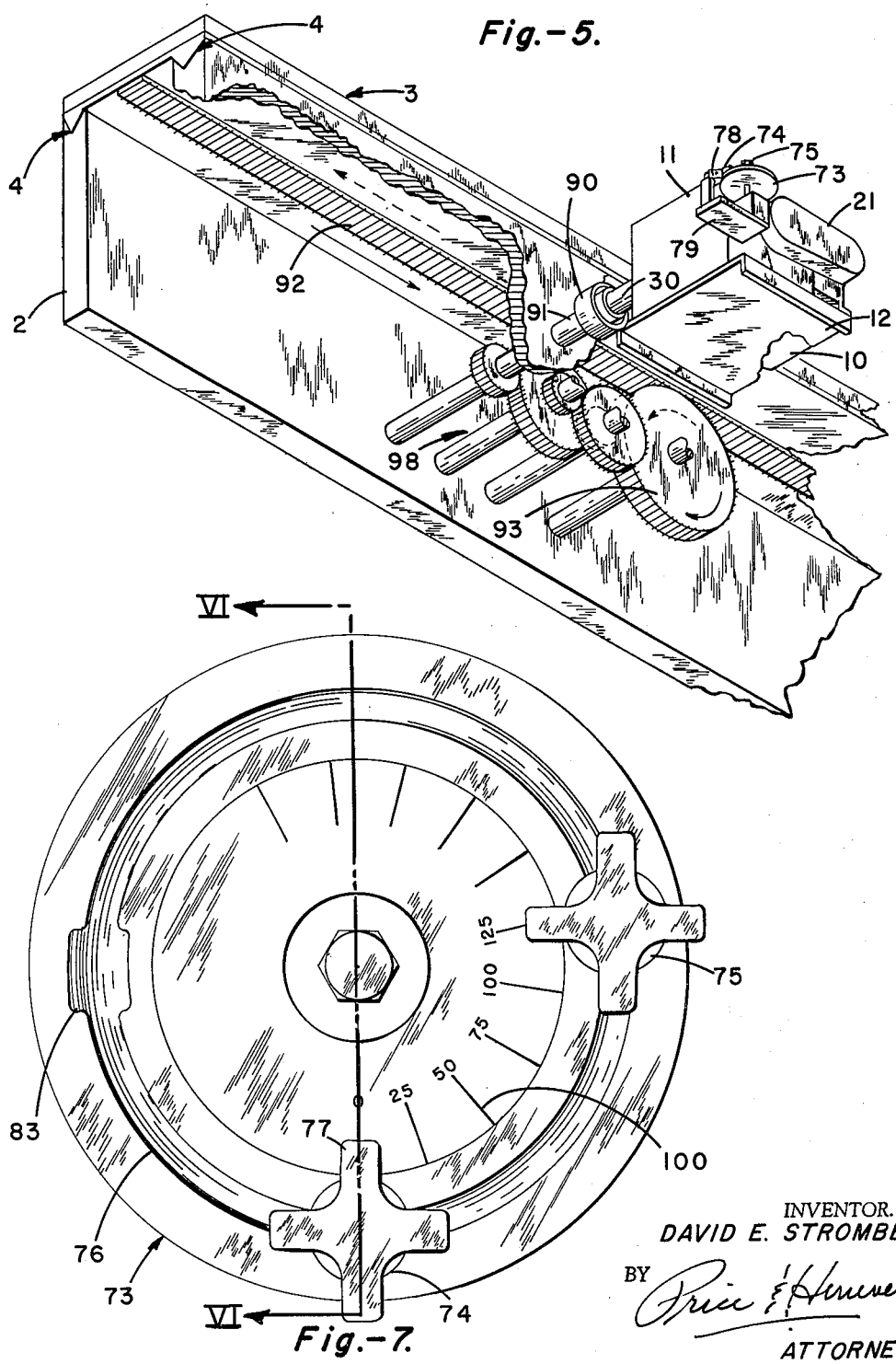
FIG. 5 is a somewhat schematic, oblique, partially broken bottom view of this invention coupled to the bed of a machine tool.

Referring specifically to the drawings, and to FIG. 1, the numeral 1 indicates a machine tool having a base 2 on which a work supporting bed 3 is mounted for reciprocation over the guideways 4 (FIG. 5). Rising above the bed 3 is a standard 5 supporting a tool arm 6. Mounted on the tool arm is a tool supporting head 7 from which a tool 8 projects downwardly to contact a work piece secured to the bed 3. Further description of the tool and its supporting structure mounted above the bed is considered unnecessary since it forms no part of this invention and is illustrated merely as a frame of reference for this invention. It will be recognized that many other tools utilizing a reciprocating bed and each of an entirely different design may be used with this invention.

The bed is moved by a power unit 9. The power unit 9 is driven by a prime mover 10, the torque of which is transmitted to the bed through the reversing transmission 11. The reversing transmission 11 is mounted on any suitable base such as the plate 12 and is enclosed by a housing 13 having a lower half 14 and an upper half 15 joined together by bolts 17 installed through the flanges 16.

The prime mover 10, as illustrated, drives a variable speed changer 19. Torque from the speed changer 19 is transmitted by suitable means such as a chain or a belt to the input shaft 20 of the transmission. The speed changer 19 may be omitted without affecting this invention. The belt or chain drive connecting the prime mover 10 to the input shaft 20 may be enclosed in a suitable cover 21. The input shaft 20 (FIG. 2) is journaled to the housing 13 by a pair of bearings 21, one at each side of the housing. One end of the shaft extends through the side of the housing 13 and is surrounded by a sealing plate 22 and a lubricant seal 23 mounted in the plate 22. The sealing plate is secured to the housing by studs 26. The other end of the input shaft 20 is enclosed by the plate 27 secured by the studs 28. Mounted on the input shaft 20 are a pair of gears 24 and 25. These gears are spaced axially of the shaft, one adjacent each side of the housing 13.

Extending through the housing is an output shaft 30. One end of the shaft projects through a side of the housing in the opposite direction to the outwardly projecting end of the input shaft 20. Surrounding the end of the output shaft 30, extending beyond the housing 13, is a sealing plate 31 and a lubricant seal 32 seated in the plate 31. The sealing plate 31 is secured to the housing 13 by suitable studs 33. The shaft is supported by a combination radial and thrust bearing 53 sealed in the sealing plate 31. The opposite end of the shaft is enclosed by a circular plate 34 also secured to the housing by suitable studs 35. This end of the shaft is also supported by a combination radial and thrust bearing mounted in the sealing plate 34.

Adjacent the plate 34, the output shaft is surrounded by a bearing 36. Concentric with the output shaft 30 is a gear 37. The gear 37 turns upon the bearing 36 and is freely rotatable with respect to the output shaft 30.

The gear 37 has two concentric but axially spaced sets of teeth. The first mesh with the gear 24 while the second mesh with the clutch plates 40 of the first magnetic clutch 41. The magnetic clutch 41 is splined to the output shaft 30 by the key 42.

Adjacent the opposite side of the housing 13, the output shaft 30 is surrounded by a bearing 50 about which is mounted a gear 51 concentric with the output shaft 30. The gear 51 is freely rotatable with respect to the output shaft 30 since it turns upon the bearing 50. The design of the gear 51 is identical to that of the gear 37 except that it is of substantially lesser diameter. Like the gear 37, it has two axially spaced toothed portions. One of the toothed portions is meshed to an intermediate gear 54 which in turn is meshed to the gear 25 on the input shaft. The second tooth portion of the gear 51, like that of the gear 37, engages the clutch plates 55 of a second magnetic clutch 56. The magnetic clutch 56 is also splined to the output shaft 30 by a key 57. It is obvious that both magnetic clutches 41 and 56 are mounted about and are concentric with the output shaft 30.

The intermediate gear 54 is supported by a suitable stud shaft and bearings, neither of which are shown since they are of conventional construction and their particular design is not a part of this invention.

The magnetic clutches are spaced axially on the output shaft 30. Electrical energy for the clutches is supplied through the conductors 65 and 66.

Keyed to the end of the output shaft 30 and projecting through the cover plate 34 is a shaft 70. The shaft 70 transmits torque from the output shaft 30 to a speed reducer 71. The details of the internal structure of the speed reducer are not illustrated since they are conventional and any one of several commercial models available on the market may be used for this purpose.

Figure 6:
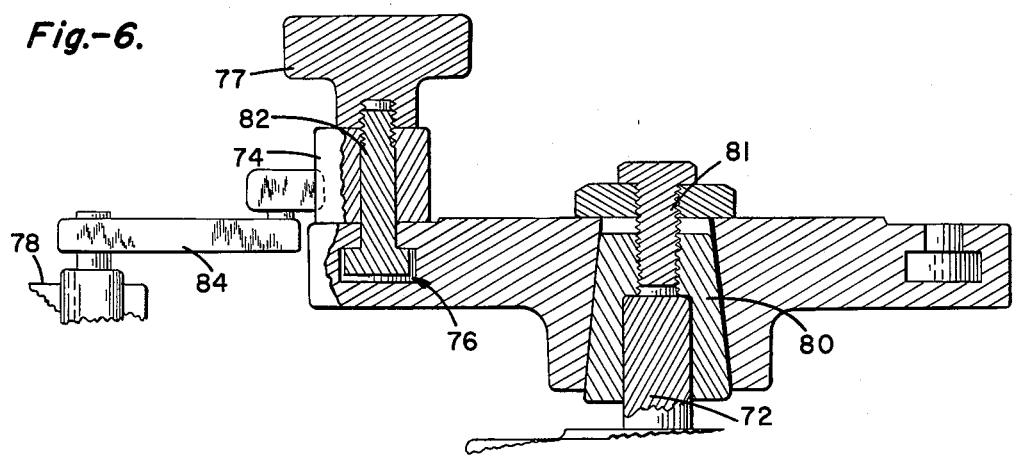
FIG. 6 is a side elevation view of the stroke length control mechanism for this invention showing the head of the mechanism in section along the plane VI—VI of FIG. 7.

The speed reducer 71 has an output shaft 72 (FIG. 6). Mounted to the output shaft 72 is a frusto-conical bushing 80. Seated about the bushing is a disk 73 secured by the stud 81. The disk and bushing are locked to the shaft 72 for rotation therewith. The disk 73 has an annular undercut channel 76 adjacent its periphery. Projecting upwardly through each of the dogs 74 and 75 is a stud 82 having its head seated in the channel 76. A handle 77 is threadedly secured to each of the studs for locking the dogs in position. An access opening 83 is provided in the channel for introducing the studs (FIG. 7). The disk 73 has a pair of tubular dogs 74 and 75. The dogs 74 and 75 cooperate with and operate a microswitch 78 by contact with its arm 84. The speed reducer 71 is mounted on a base 79 which, in turn, is secured to the housing 13 by any suitable means.

The output shaft 30 of the reversing transmission 11 is secured to the drive shaft 91 of the bed driving gear train 98 of the machine tool through a flexible coupling 90 (FIG. 5). Various means may be used to translate the rotary motion of the shaft 91 to reciprocating motion in the work bed 3. The means used is not a part of this invention. Thus, the use of the rack 92 meshing with the pinion gear 93 of the gear train 98 is merely illustrative of one means by which this may be accomplished.

Inspection ports 95 may be provided in the top or upper half of the housing 15. The housing may also be provided with ears 96 to facilitate its transportation when it is necessary to move it from its working position. Electrical power for the unit is supplied through the box 97. It will be recognized that any suitable type of power arrangement may be provided for this purpose.

Figure 8:
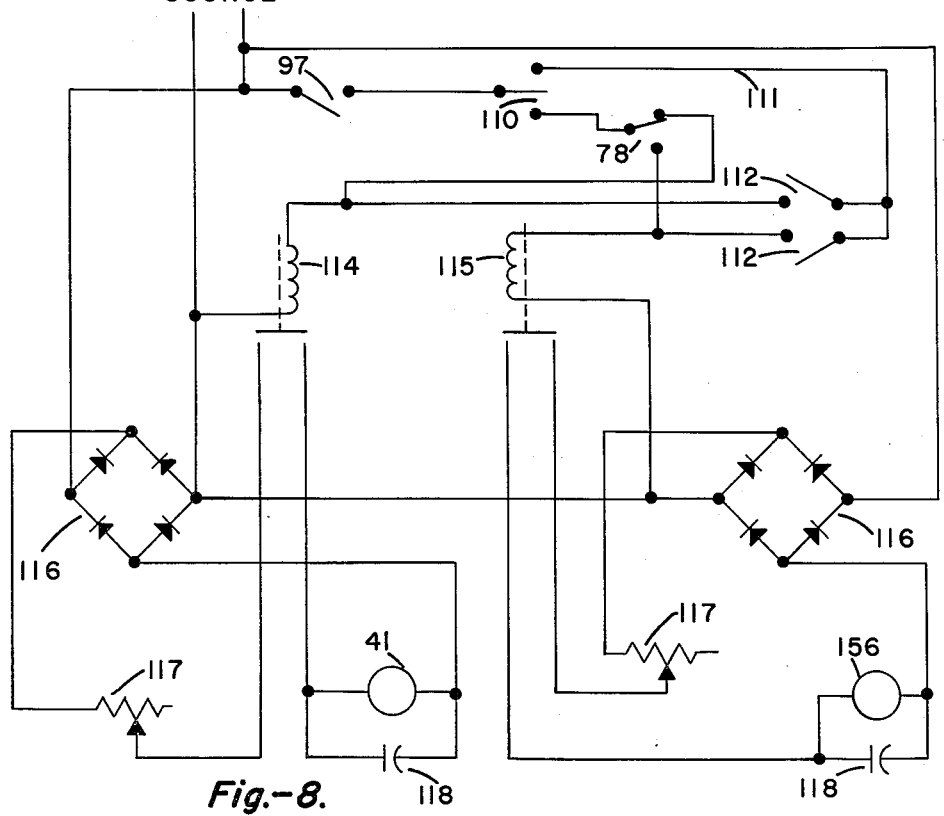
FIG. 8 is a diagram of the electrical circuit for this invention.

FIG. 8 illustrates the electrical means for controlling the operation of the transmission. Power from a suitable source passes through a main control switch 97 to a selector switch 110. When line 111 is closed the power passes through the manual control switches 112. These switches permit the operator to manually regulate the stroke length and direction of travel of the bed.

When the selector switches 110 closes line 113 the operation of the clutches 41 and 56 is controlled by the automatic selector switch 78 regulated by the dogs 74 and 75. Irrespective of whether the manual switches 112 or the automatic switch 110 is used the energization of the clutches 41 and 56 is controlled by the relays 114 and 115, respectively. Each of the clutches is powered through an A.C.-D.C. converter 116, a variable resistor 117 and is bridged through a capacitor 118. The particular arrangement shown is but one of various arrangements which may be employed and therefore is not to be considered as a limitation upon the invention.

*Operation*

Figure 4:
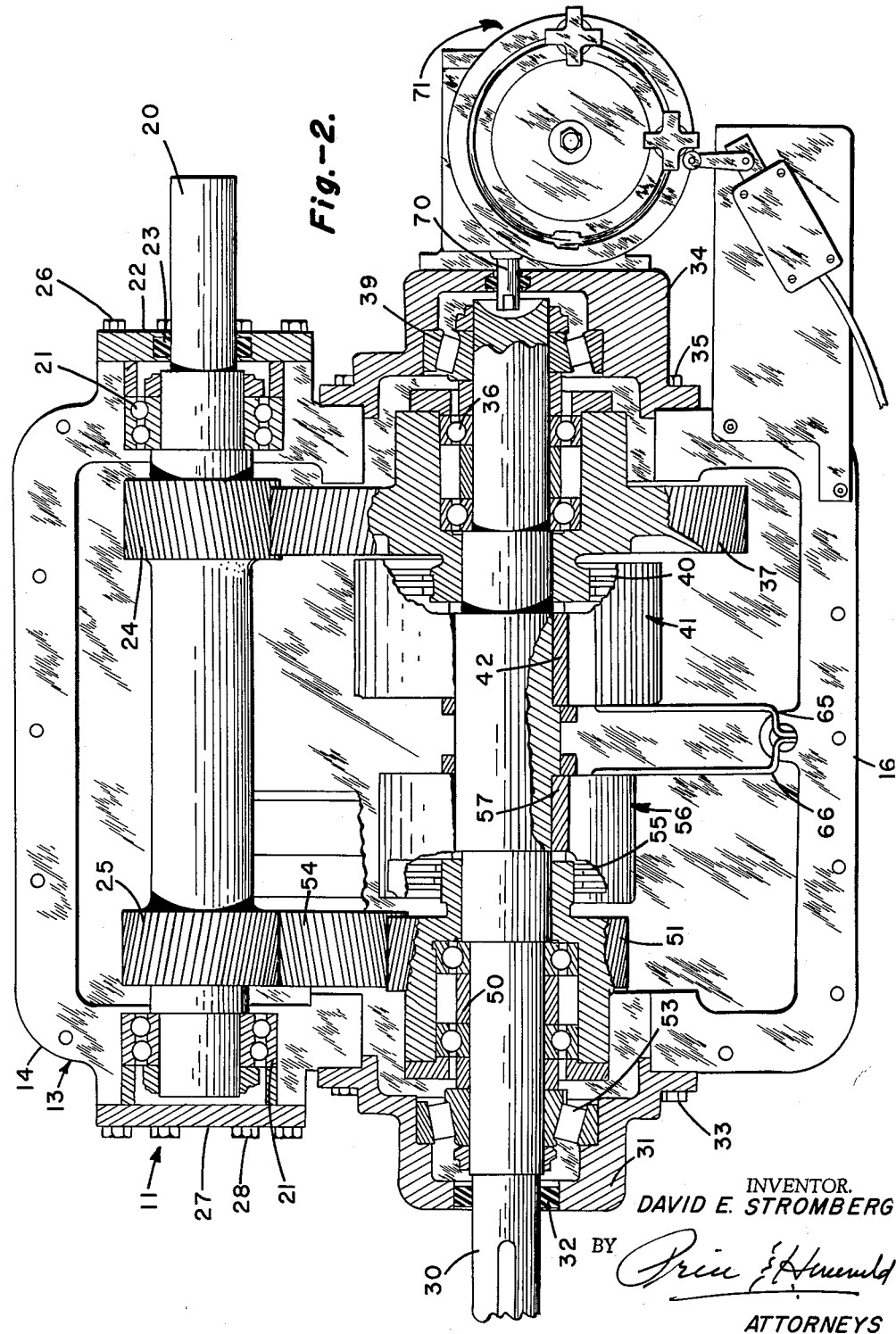
FIG. 4 is a schematic view of the gear train shown in FIG. 3 but in reverse or return drive.

The prime mover 10 rotates the input shaft 20 constantly in one direction as indicated by the arrows (FIG. 3). Since the gears 24 and 25 are fixedly secured to the input shaft 20, they constantly drive the gear 37 and the gears 54 and 51. It will be noted, however, that since gear 24 is meshed directly to gear 37 while gear 25 transmits its power to gear 51 through an intermediate gear 54, the gears 37 and 51 rotate in opposite directions. Since the gears 37 and 51 are freely rotatable about the output shaft 30, unless one of the magnetic clutches 41 and 56 is engaged, no torque will be transmitted to the output shaft 30. However, when the magnetic clutch 41 is engaged, torque will be delivered to the output shaft 30 through the gear 37 and thus the output shaft 30 will rotate oppositely to that of the input shaft 20, as indicated by the arrows in FIG. 3. In this case, the fact that gear 51 is positively driven from the gear 25 through the gear 54 is immaterial since it may rotate freely with respect to the output shaft 30. Upon disengagement of the magnetic clutch 41 and engagement of the magnetic clutch 56, the direction of rotation of the output shaft 30 will be reversed since power then is transmitted through the gear chain consisting of the gear 25 intermediate gear 54 and gear 51 (FIG. 4). The disengagement of the magnetic clutch 41 releases the gear 37, permitting it to rotate freely with respect to the output shaft 30.

As the output shaft 30 is rotated, its rotary motion is transmitted through the shaft 70 and speed reducer 71 to the disk 73. When the disk is rotated to bring one of the dogs 74 or 75 into contact with the arm 84 of the microswitch 78, the magnetic clutch then engaged will be de-energized and thus released and the other magnetic clutch will be engaged. Immediately, the direction of rotation of the output shaft 30 will be reversed and the disk 30 will be rotated in the opposite direction until the other of the dogs 74 and 75 engages the microswitch 78 to cause that clutch to be disengaged and the first clutch to be re-engaged, once again reversing the direction of rotation of the output shaft. In this manner, the prime mover 10 causes the shaft 30 and the pinion gear 93 to rotate in one direction, driving the bed toward one end of the base 2. When the bed 3 has traveled a predetermined distance, one of the dogs 74 or 75 will engage the microswitch, switching the energization of the magnetic clutches 41 and 56 from one to the other, reversing the direction of rotation of the output shaft 30 and thus the pinion gear 93. This will immediately cause the bed to cease its motion in the direction in which it has been traveling and propel it toward its starting position.

Since the length of travel of the bed 3 is positively related to the number of revolutions of the output shaft 30 and the rotation of the disk 73 is also positively related to the revolutions of the output shaft 30, the positions of the dogs 74 and 75 will accurately limit travel of the bed 3. The travel of the bed 3 may be varied quickly and easily simply by releasing the dogs 74 and 75 from the disk 73 and respacing them. No other adjustment is necessary to vary the length of stroke of the bed. This adjustment is simple, quick and permits visual coordination between the bed and its stroke regulating mechanism. For this purpose, movement of the bed will be regulated manually by moving the selector switch 110 to close line 111 and manipulating the manual switches 112. The operator merely has to move the bed in the desired direction until the limit of travel it is desired to employ has been reached. The operator then locates one of the dogs so that it, at this point, just trips the microswitch 78. By moving the bed in the opposite direction to the limit of travel desired in that direction, he may make a similar adjustment of the other dog. Graduated indicia 100 may be impressed on the surface of the disk by which the operator may set the dogs in various positions which read directly on the length of stroke of the bed 3.

It will be noted that gear 37 is substantially larger than gear 24. This effects a speed reduction between the input and output shafts 20 and 30 when this gear train is in operation. This gear train drives the bed 3 in the forward or cutting stroke of its reciprocating movement. It will be noted that the gear 51 is comparable in size to gear 25 and thus the reduction in speed when this gear train is in operation does not occur. This gear train is designed to return the bed to its initial position. The difference in angular velocity of the output shaft 30 produced by the gear trains permits this driving mechanism to return the bed at a substantially greater speed than it propels it in the cutting stroke. This materially increases the efficiency of the machine since the return stroke is a time consuming operation and the faster it is completed the greater the capacity of the machine tool.

It will be recognized that for various operations on the same machine various cutting speeds may be required. For this purpose, the machine tool may have a variable speed control between the shaft 91 and the pinion gear 93. The use of this invention does not interfere with the function and operation of the variable speed reducer since various bed speeds may be obtained by adjustment of the variable speed reducer. Where the existing equipment does not provide this but variable speeds are desired the variable speed changer 19 may be employed. It is also possible to provide equipment to vary the speed of the prime mover 10 as a means of obtaining various bed speeds. At the same time, the variable speed reducer does not eliminate the high speed return effect produced by this reversing transmission.

This invention overcomes one of the great difficulties of machine tools having reciprocating beds. These reciprocating beds are frequently large, massive and exceedingly heavy pieces of equipment and, when they reach the end of a stroke and must be brought to a full stop and then reversed in direction, the forces necessary to accomplish this accurately and rapidly are substantial. The high momentum which must be overcome by the driving mechanisms in bringing the bed to a full stop and the inertia which must be overcome in again placing the bed in mortion in the opposite direction imposes severe shock loads on the bed driving mechanism. This invention is a substantial improvement over previously available equipment for this purpose. It both eliminates and absorbs shock loading. A small amount of the shock is overcome by the flexible coupling 90 and the major portion of it, however, is absorbed in the slippage permitted by the magnetic clutches 41 and 56. Further, since all of the various moving driving means for the bed are operating in rotary motion and are thus capable of being securely held in adequate bearings, this shock load may be absorbed without permitting any of the parts to flex or shift their operating position.

The operation of the magnetic clutches functions as a shock absorbing cushion, a result which cannot be obtained with any standard type of friction or mechanical clutch. This shock cushioning or absorbing effect greatly increases the life not only of the machine tool proper but also of the driving mechanism. More importantly, however, it materially increases the accuracy of the machine tool itself because it eliminates the vibration and shock so commonly experienced in even the largest and most massively built equipment when the movement of these massive beds is stopped and reversed. This problem is so great as to frequently limit the speed of travel of the bed in either direction, therefore, reducing the capacity of the machine tool below that which is theoretically possible with the type of tools being used on the machine. Because of this cushioning and shock elimination effect, the speed of the bed may be increased to obtain a higher capacity in this type of equipment.

Since this reversing mechanism may be coupled to the existing driving structure for the beds of existing machine tools, it may be added to existing machine tools to replace the conventional drives with which they were originally equipped. Thus, it is a means of increasing the efficiency and life of existing equipment as well as that of new equipment initially designed to incorporate this invention.

While there has been described a preferred embodiment of this invention, it will be recognized that various modifications of this invention may be made within the framework of its principles. Such of these modifications as embody the principles of the invention are to be considered as included in the hereinafter appended claims unless these claims by their language expressly state otherwise.

I claim:

1. In a machine tool having a reciprocating bed, the combination comprising: a bed driving means adapted to translate rotary motion to reciprocating lineal motion, said means having a rotatable driving shaft; a rotary motion reverser having an input shaft and an output shaft; a pair of gear trains each having a driving gear mounted on and rotatable with said input shaft and a driven gear concentric with and freely rotatable with respect to said output shaft; one of said gear trains having one more gear than the other thereof whereby the driven gear thereof rotates oppositely of the driven gear of the other of said gear trains; a pair of clutches each having one element thereof secured to said output shaft for rotation therewith; a second element of one of said clutches being secured to the driven gear of said one gear train and a second element of the other of said clutches being secured to the driven gear of said other of said clutches whereby the direction of rotation of said output shaft is determined by alternate engagement of said clutches; means for driving said input shaft in a constant direction; and means connecting said output shaft to said driving shaft for transmitting rotary motion therebetween.

2. In a machine tool having a reciprocating bed, the combination comprising: a bed driving means adapted to translate rotary motion to reciprocating lineal motion, said means having a rotatable driving shaft; a rotary motion reverser having an input shaft and an output shaft; a pair of gear trains each having a driving gear mounted on and rotatable with said input shaft and a driven gear concentric with and freely rotatable with respect to said output shaft; one of said gear trains having one more gear than the other thereof whereby the driven gear thereof rotates oppositely of the driven gear of the other of said gear trains; a pair of clutches each having one element thereof secured to said output shaft for rotation therewith; a second element of one of said clutches being secured to the driven gear of said one gear train and a second element of the other of said clutches being secured to the driven gear of said other of said clutches whereby the direction of rotation of said output shaft is determined by alternate engagement of said clutches; means for sensing the number of revolutions of said output shaft in each direction and operatively connected to both of said clutches for engaging them alternately.

3. In a machine tool having a reciprocating bed, the combination comprising: a bed driving means adapted to translate rotary motion to reciprocating lineal motion, said means having a rotatable driving shaft; a rotary motion reverser having an input shaft and an output shaft; a pair of gear trains each having a driving gear mounted on and rotatable with said input shaft and a driven gear concentric with and freely rotatable with respect to said output shaft; one of said gear trains having one more gear than the other thereof whereby the driven gear thereof rotates oppositely of the driven gear of the other of said gear trains; a pair of clutches each having one element thereof secured to said output shaft for rotation therewith; a second element of one of said clutches being secured to the driven gear of said one gear train and a second element of the other of said clutches being secured to the driven gear of said other of said clutches whereby the direction of rotation of said output shaft is determined by alternate engagement of said clutches; an electrical switch means adapted on each operation to disengage the then engaged one of said clutches and engage the other thereof; a head rotated by said output shaft; a pair of dogs detachably secured to said head for variable spacing and each adapted to operate said switch.

4. In a reversing drive for a machine tool having a reciprocating member, the combination comprising: a housing having an input shaft and an output shaft; a pair of gear trains each having a driving gear mounted on and rotatable with said input shaft and a driven gear concentric with and freely rotatable with respect to said output shaft; one of said gear trains having one more gear than the other thereof whereby the driven gear thereof rotates oppositely of the driven gear of the other of said gear trains; a pair of clutches each having one element thereof secured to said output shaft for rotation therewith; a second element of one of said clutches being secured to the driven gear of said one gear train and a second element of the other of said clutches being secured to the driven gear of said other of said clutches whereby the direction of rotation of said output shaft is determined by alternate engagement of said clutches; an electrical switch means adapted on each operation to cause disengagement of the then engaged one of said clutches and engagement of the other thereof; switch operating means driven by said output shaft, said switch operating means including a head rotated by said output shaft; a pair of dogs detachably secured to said head for variable spacing and each of said dogs adapted to operate said switch.

References Cited in the file of this patent

UNITED STATES PATENTS

| 761,459 | Eastwood | May 31, 1904 |
| 808,226 | Anderson | Dec. 26, 1905 |
| 1,486,923 | Ross | Mar. 18, 1924 |
| 2,528,736 | Bullard | Nov. 7, 1950 |
| 2,600,667 | Mason | June 17, 1952 |
| 2,872,003 | Nussbaumer | Feb. 3, 1959 |
| 2,886,155 | Hadley | May 12, 1959 |

FOREIGN PATENTS

| 68,106 | Norway | July 17, 1944 |
| 1,149,339 | France | July 8, 1957 |